(12) United States Patent
Kain

(10) Patent No.: US 6,464,294 B1
(45) Date of Patent: Oct. 15, 2002

(54) HEADREST FOR JUVENILE VEHICLE SEAT

(75) Inventor: James M. Kain, Troy, OH (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 09/877,772

(22) Filed: Jun. 8, 2001

(51) Int. Cl.⁷ .................................................. B60N 2/28
(52) U.S. Cl. ..................................... 297/250.1; 297/410
(58) Field of Search ............................. 247/250.1, 397, 247/400, 410

(56) References Cited

U.S. PATENT DOCUMENTS

| | | | | |
|---|---|---|---|---|
| 394,271 A | * | 12/1888 | Hooven | 297/397 |
| 2,990,008 A | * | 6/1961 | Bien | 297/397 |
| 4,854,639 A | * | 8/1989 | Burleigh et al. | 297/250.1 |
| 6,030,047 A | | 2/2000 | Kain | 297/250.1 |
| 6,139,100 A | | 10/2000 | Baskin-Lockman et al. | 297/250.1 |
| 6,155,638 A | * | 12/2000 | Bapst | 297/250.1 |
| 6,193,311 B1 | * | 2/2001 | Payton | 297/250.1 |

* cited by examiner

Primary Examiner—Peter R. Brown
(74) Attorney, Agent, or Firm—Barnes & Thornburg

(57) ABSTRACT

A juvenile vehicle seat includes a seat bottom and a seat back extending upwardly from the seat bottom. A headrest is mounted to move in a recess formed in the seat back between lowered and raised positions. A headrest retainer is located in the headrest recess and configured to retain the headrest in either the lowered position or the raised position at the option of a user.

30 Claims, 6 Drawing Sheets

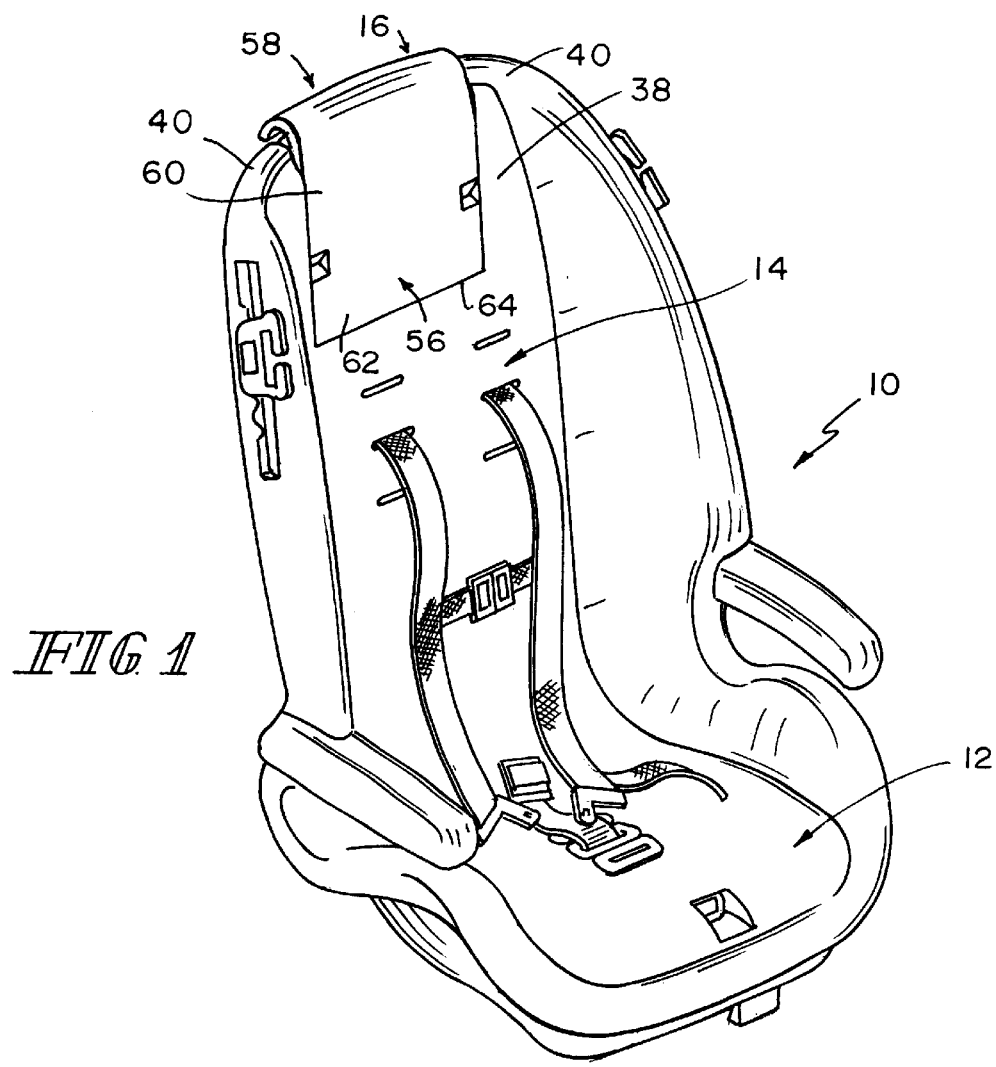
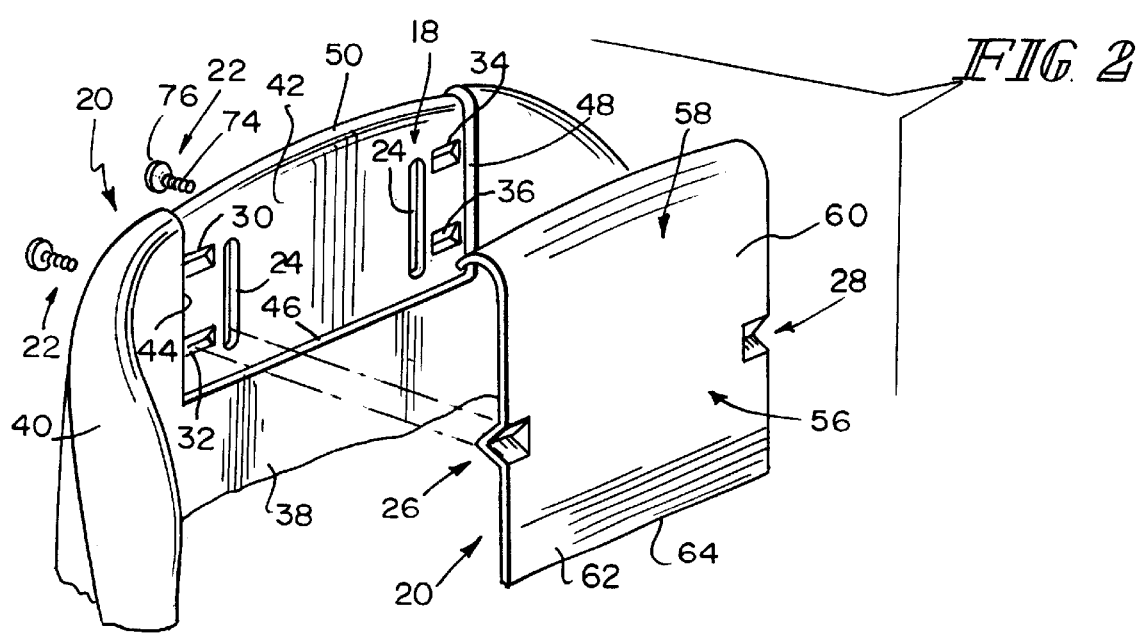

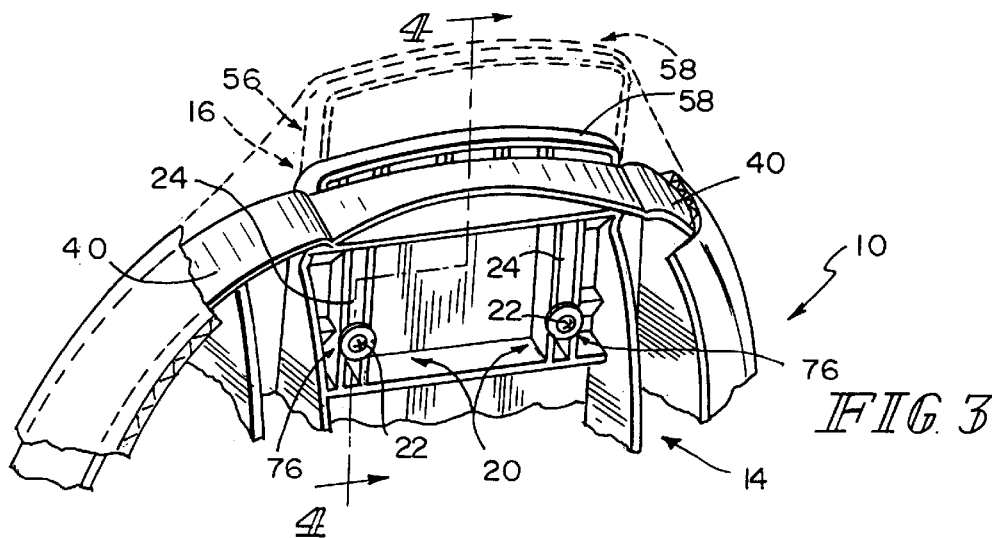
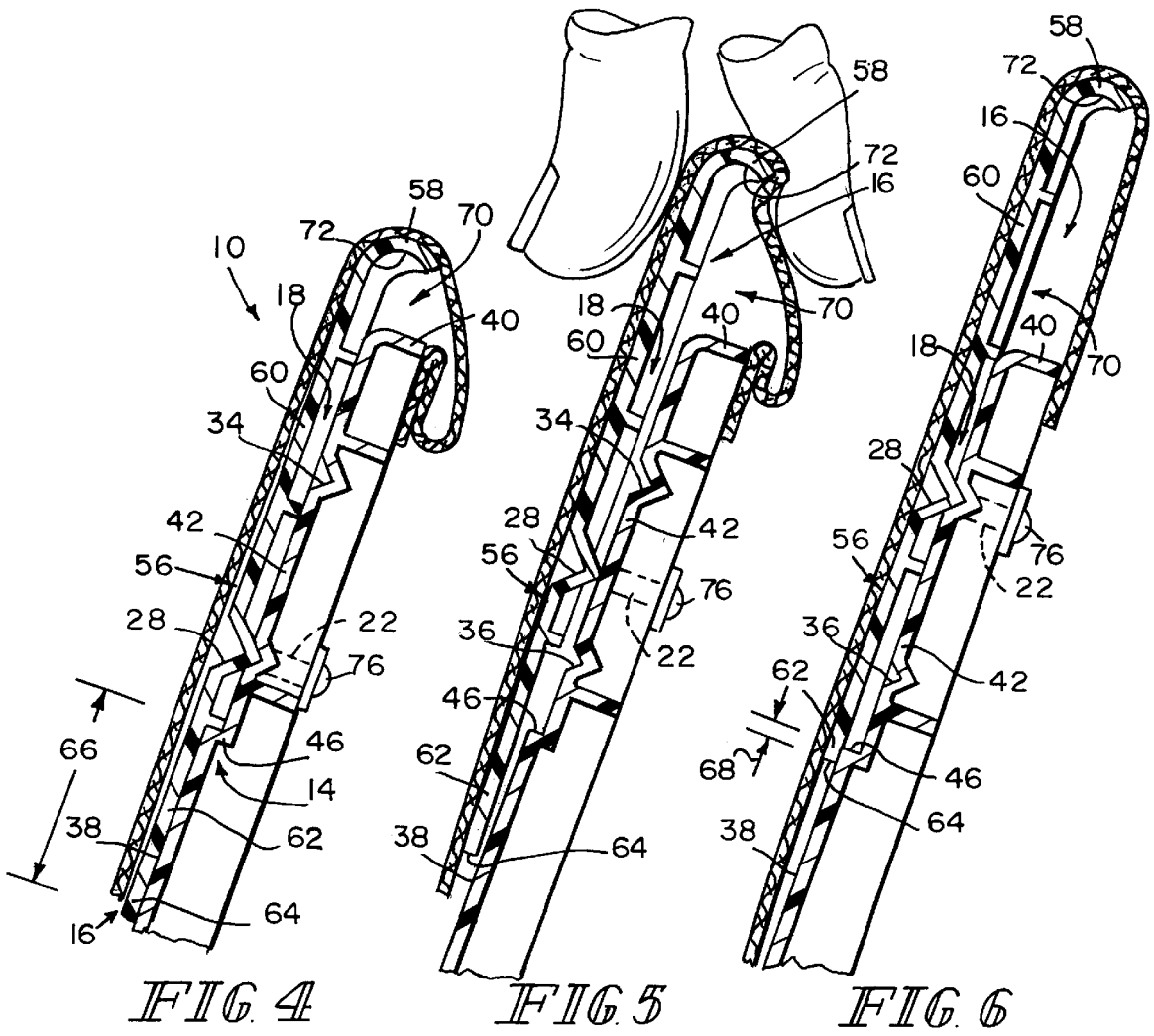

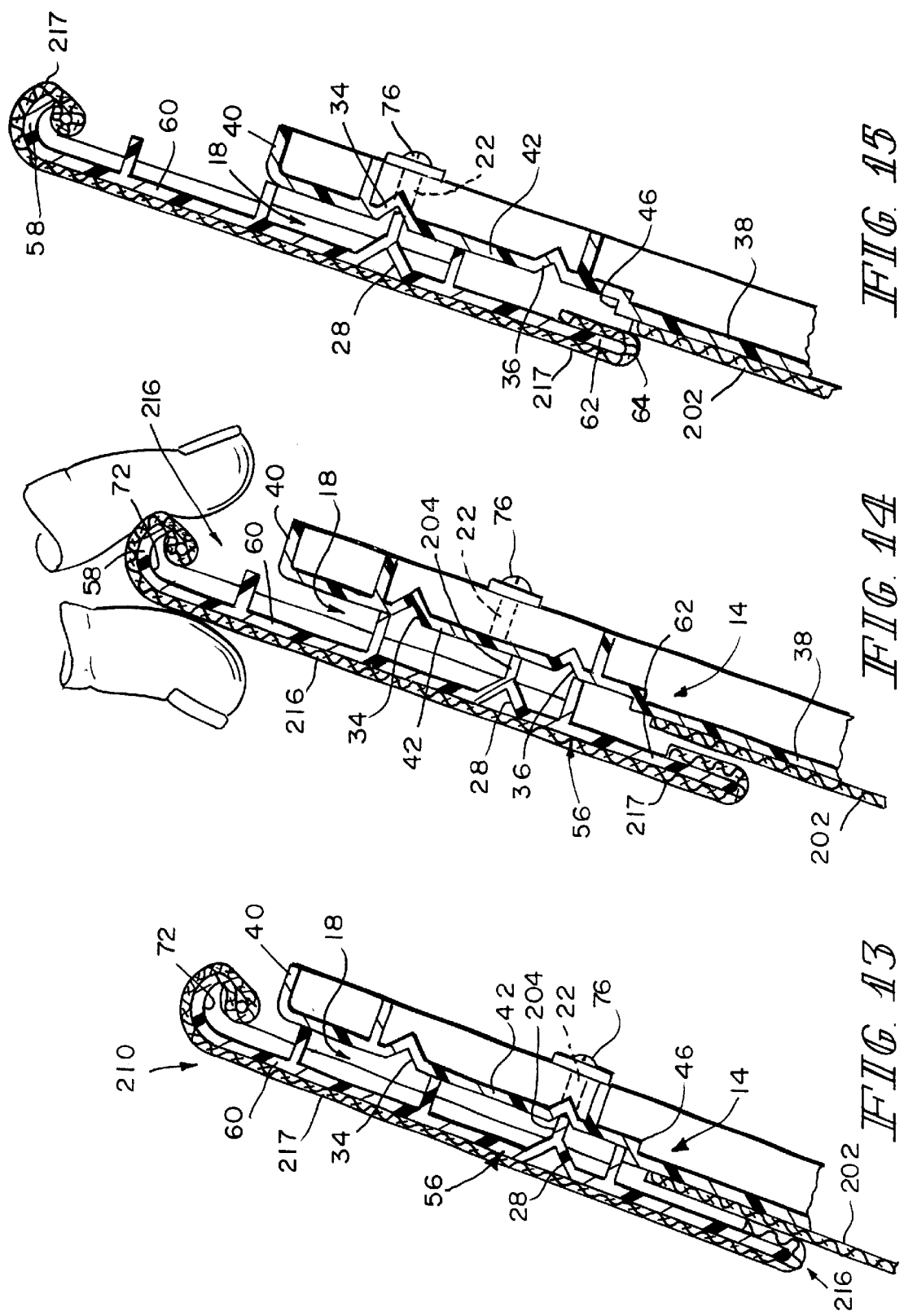

HEADREST FOR JUVENILE VEHICLE SEAT

BACKGROUND AND SUMMARY OF THE INVENTION

The invention relates to juvenile vehicle seats, and particularly to a headrest for use with a juvenile vehicle seat. More particularly, the invention relates to a headrest mounted for movement on a seat back included in a juvenile vehicle seat.

According to the disclosure, a juvenile vehicle seat includes a seat bottom and a seat back extending upwardly from the seat bottom. A headrest is mounted to move in a recess formed in the seat back between lowered and raised positions. A headrest retainer is located in the headrest recess and configured to retain the headrest in either the lowered position or the raised position at the option of a user.

In preferred embodiments, the headrest recess has an opening along an upper edge of the seat back and in a forwardly facing upper portion of the seat back. An upper portion of the headrest extends into the headrest recess and a lower portion of the headrest lies in front of the forwardly facing surface of the seat back.

The headrest retainer includes a headrest guide and a headrest locator. The guide includes a post coupled to the headrest and arranged to pass through a slot formed in the seat back to open into the headrest recess. The locator includes a pair of notches formed in the seat back to open into the headrest recess and a detent arranged to fit into a first of the notches when the headrest is moved to assume its lowered position and into a second of the notches when the headrest is moved to assume its raised position. The headrest is designed to yield somewhat so that a user gripping a top flange included in the headrest can move the headrest between its lowered and raised positions by pulling up or pushing down on the top flange to disengage the detent from one of the notches so that the detent can engage the other of the notches to establish a new position of the headrest relative to the seat back.

Features of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 a perspective view of a juvenile vehicle seat showing a movable headrest on an upper portion of a seat back included in the juvenile vehicle seat;

FIG. 2 is an enlarged view of the upper portion of the seat back illustrated in FIG. 1 showing the movable headrest prior to installation of that headrest in a recess formed in the upper portion of the seat back;

FIG. 3 is a rear perspective view of the upper portion of the seat back illustrated in FIG. 2 showing portions of a seat pad placed on the seat back and wrapped around a rearwardly extending perimeter flange included in the seat back and showing (in phantom) upward movement of the movable headrest (and a portion of the seat pad adjacent to the headrest) relative to the seat back;

FIG. 4 is a sectional view taken along line 4—4 of FIG. 3 showing the headrest retained in a "lowered position" relative to the seat back to provide a finger-receiving space located between upper edges of the seat back and headrest but "covered" by hanging loop of fabric included in the seat pad;

FIG. 5 is a sectional view similar to FIG. 4 showing upward movement of the headrest in the recess formed in the upper portion of the seat back caused by a person gripping the seat pad and the headrest and using the finger-receiving space provided between upper edges of the seat back and headrest;

FIG. 6 is a sectional view similar to FIGS. 4 and 5 showing the headrest retained in a "raised position" relative to the seat back (corresponding to the position shown in phantom in FIG. 3) and showing how the "hanging loop"of fabric included in the seat pad and own in FIG. 4 has been stretched to allow upward movement of the headrest raised position;

FIG. 13 is a sectional view taken along line 13—13 of FIG. 11 showing the fabric-covered headrest retained in the lowered position;

FIG. 14 is a sectional view similar to FIG. 13 showing upward movement of the fabric-covered headrest in the recess formed in the upper portion of the seat back; and FIG. 15 is a sectional view taken along line 15—15 of FIG. 12 showing the fabric-covered headrest retained in the raised position.

DETAILED DESCRIPTION OF THE DRAWINGS

Figure 7:
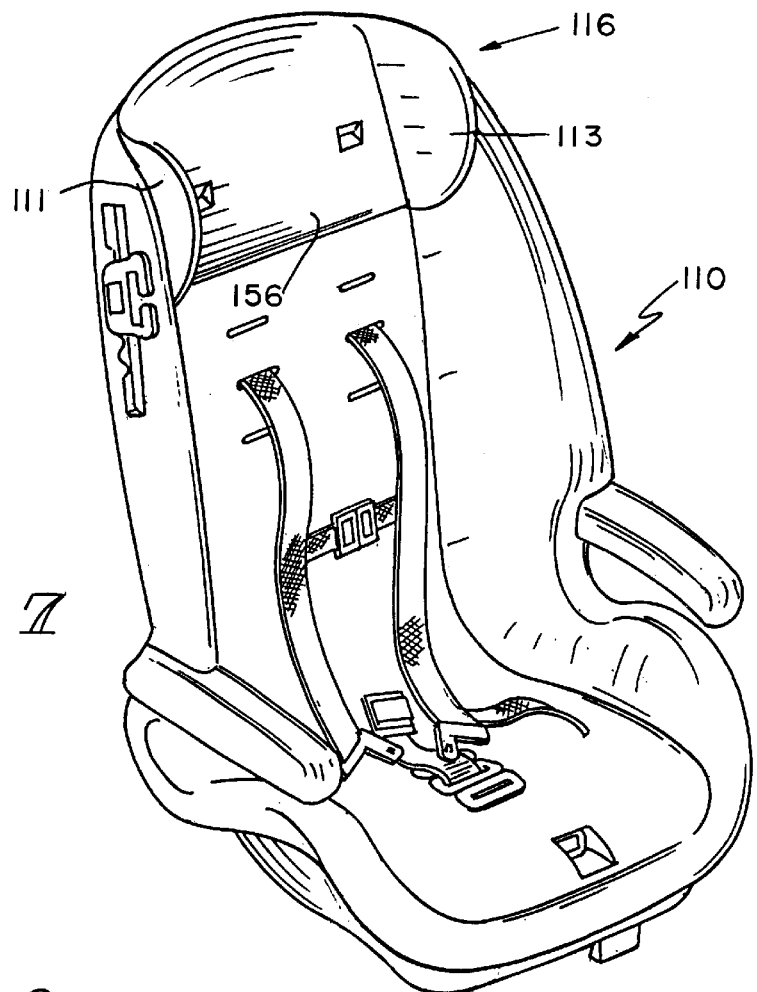
FIG. 7 is a perspective view of a juvenile vehicle seat including a movable headrest provided with side wings and located on an upper portion of a seat back included in juvenile vehicle seat.

A juvenile vehicle seat 10 includes a seat bottom 12 and a seat back 14 extending upwardly from seat bottom 12. As shown, for example, in FIGS. 1 and 2, a movable headrest 16 is arranged to extend into a headrest recess 18 formed in seat back 14.

A headrest retainer 20 is located in the headrest recess 18 and is configured to retain headrest 16 in either a lowered position shown in FIGS. 1 and 4 or a raised position shown in FIG. 6 at the option of a user. Headrest retainer 20 includes guide posts 22 and guide slots 24 as well as detents 26, 28 and detent notches 30, 32, 34, 36 as shown best in FIG. 2.

Seat back 14 includes a forwardly facing surface 38 adapted to face toward an occupant of seat 10 as shown in FIGS. 1 and 2. Seat back 14 also includes a perimeter rim 40 lying along an upper section of seat back 14 adjacent to headrest 16 as show, for example, in FIGS. 3–6.

Headrest recess, or inset, 18 is defined by an upper wall 42 and an interior edge 44, 46, 48 bordering upper wall 42, both of which are included in seat back 14, as shown in FIG. 2. Interior edge 44, 46, 48 is U-shaped and arranged to interconnect upper wall 42 and forwardly facing surface 38 to cause headrest recess 18 to have an opening in forwardly facing surface 38 as shown, for example, in FIG. 2. Interior edge 46 is arranged to define a lowermost border of headrest recess 18 as shown in FIG. 2.

Upper wall 42 of seat back 14 provides a vertical "recess floor" while interior edges 44, 46, 48 provide horizontal "recess side walls." Upper wall 42 includes a convex curved upper edge 50 and has a somewhat rectangular shape when viewed head-on as suggested in FIG. 2. Upper wall 42 also includes a forwardly facing surface 52 situated to face toward headrest 20 when headrest 20 is mounted for movement on seat back 14.

Headrest 16 includes a headrest panel 56 and a top flange 58 configured to be gripped by a user as shown in FIG. 5 to enable the user to move headrest panel 56 up and down relative to seat back 14. Headrest panel 56 includes an upper portion 60 extending into headrest recess 18 and a lower portion 62 lying in front of forwardly facing surface 38 of seat back 14 as suggested in FIG. 2 and shown in FIGS. 4–6.

Headrest 16 is mounted for movement relative to seat back 14 between a lowered position shown in FIGS. 1, 3, and 4 and a raised position shown in FIG. 3 (in phantom) and in FIG. 4. In the lowered position, headrest 18 is positioned to lie a first distance away from seat bottom 12. In the raised position, headrest 18 is positioned to lie a second distance away from seat bottom 12, which second distance is greater than the first distance. As shown in FIGS. 4 and 6, lower portion 62 of headrest panel 56 includes a lowermost edge 64 that is positioned to lie a first distance 66 below interior edge 46 bordering headrest recess 18 when headrest 16 is moved to assume the lowered position. Further, lowermost edge 64 is positioned to lie a lesser second distance 68 below interior edge 46 when headrest 16 is moved to assume the raised position.

Top flange 58 is arranged to extend rearwardly away from upper portion 60 of headrest panel 56 to provide a finger-receiving space 70 between top flange 58 and upper edge 50 of upper wall 42 in seat back 14 as shown, for example, in FIGS. 4–6. This finger-receiving space 70 is sized and located to facilitate gripping of headrest 16 by a user to enable the user to move headrest 16 up and down relative to seat back 14 between the raised and lowered positions.

Top flange 58 is curved in cross section as suggested in FIG. 2 and shown in FIGS. 4–6. Top flange 58 includes a concave surface 72 arranged to face downwardly toward a portion of perimeter rim 40 of seat back 14.

Headrest retainer 20 includes a headrest guide and a headrest locator. The guide includes guide posts 22 and guide slots 24 and couples headrest 16 to seat back 14, yet allows movement of headrest 16 in either the lowered position shown in FIG. 4 or the raised position shown in FIG. 6 at the option of the user.

Guide slots 24 are formed in upper wall 42 of seat back 14 as shown in FIG. 2. Each guide slot 24 is elongated and guide slots 24 are arranged to extend vertically in spaced-apart parallel relation one to another. Each guide post 22 is a connector that extends through and reciprocates in a guide slot 24 and includes at one end a foot 74 coupled to headrest 16. Each guide post 22 also includes at an opposite end a head 76 sized to block removal of the post from guide slot 24. In the illustrated embodiment, two guide posts 22 and two guide slots 24 are provided; nevertheless it is within the scope of this disclosure to use one or more such posts/slots to guide headrest 16 as it moves up and down on seat back 14 between raised and lowered positions.

Locator notches 30, 32, 34, 36 are formed in upper wall 42 of seat back 14 as shown in FIG. 2. Each locator notch is sized to receive one of the detents 26, 28 provided on headrest 16. First notches 32, 36 are associated with the lowered position of headrest 16 and are formed in upper wall 42 to open into headrest recess 18. Second notches 30, 34 are associated with the raised position of headrest 16 and are formed in upper wall 42 to lie below curved upper edge 50 and above first notches 32, 36 and to open into headrest recess 18. Each detent 26, 28 is coupled to headrest panel 56 and sized to fit into one of the first notches 32, 36 upon movement of headrest 16 to assume the lowered position shown in FIGS. 1, 3, and 4 and to fit into one of the second notches 30, 34 upon movement of headrest 16 to assume the raised position shown in FIG. 3 (in phantom) and in FIG. 6.

Each notch 30, 32, 34, 36 is defined by a pair of diverging walls arranged to define a dihedral included angle therebetween of about 45 degrees as shown in FIGS. 2 and 4–6. Each detent 26, 28 is defined by a pair of converging walls arranged to define a dihedral included angle therebetween of about 45 degrees as shown in FIGS. 2 and 4–6. Each detent 26, 28 is sized to mate with notches 30, 32, 34, 36 to "anchor" the headrest in either the raised or lowered position as determined by the position of the headrest 16 relative to the seat back 14.

Headrest panel 56 is made of a yieldable material such as polypropylene to deform (as shown, for example, in FIG. 5) when the detents 26, 28 have been disengaged from the notches 30, 32, 34, 36 and moved in contact with upper wall 42 along paths extending between first notches 32, 36 and second notches 30, 34. Headrest panel 56 provides spring means for yieldably urging detents 26, 28 into engagement with selected notches upon arrival of headrest 16 at one of the raised and lowered positions on seat back 14. As shown, for example, in FIG. 2, one group of notches 34, 36 is formed in upper wall 42 and arranged to lie in spaced-apart relation to another group of notches 30, 32 to position the two guide slots 24 therebetween.

Juvenile vehicle seat 10 also includes a pliable seat pad 80 made of, for example, a fabric or plastics material and used as a cover for seat bottom 12 and seat back. An upper portion of seat pad 80 is shown in FIG. 3 (in phantom) and in FIGS. 4–6 (in cross section). Seat pad 80 has a perimeter portion 82 coupled to seat back 14. Perimeter portion 82 is arranged to extend from seat back 14 and along top flange 58 and the upper portion 60 of headrest panel 56 to cover an opening into the finger-receiving space 70 provided between perimeter rim 40 of seat back 14 and top flange 58 of headrest 16.

Pliable seat pad 80 is deformable as shown in FIG. 5 to move relative to headrest 16 as a user pushes a portion of seat pad 80 into finger-receiving space 70 to grip top flange 58 of headrest 16. As shown, for example, in FIG. 4, a section 84 of perimeter portion 82 of seat pad 80 is sized to form a hanging loop behind seat back 14 when headrest 16 is moved to assume the lowered position. As shown, for example, in FIG. 6, that same section 84 of perimeter portion 82 of seat pad 80 is sized to form a taut land above seat back 14 when headrest 16 is moved to assume the raised position.

Figure 8:
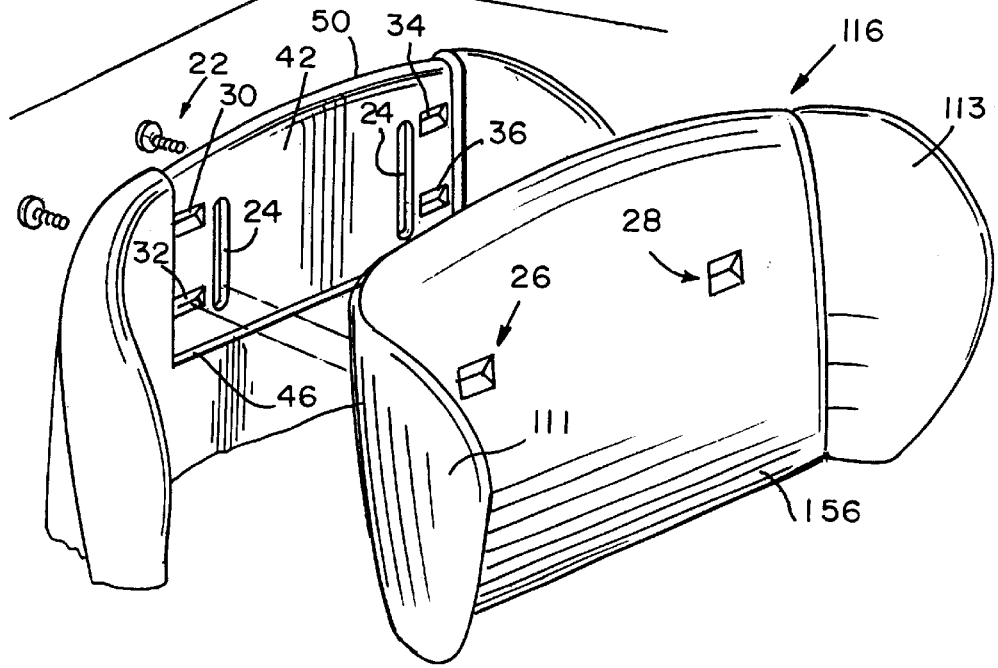
FIG. 8 is an enlarged perspective view of the upper portion of the seat back illustrated in FIG. 7 showing the movable headrest prior to installation of that headrest in a recess formed in the upper portion of the seat back.
Figure 9:
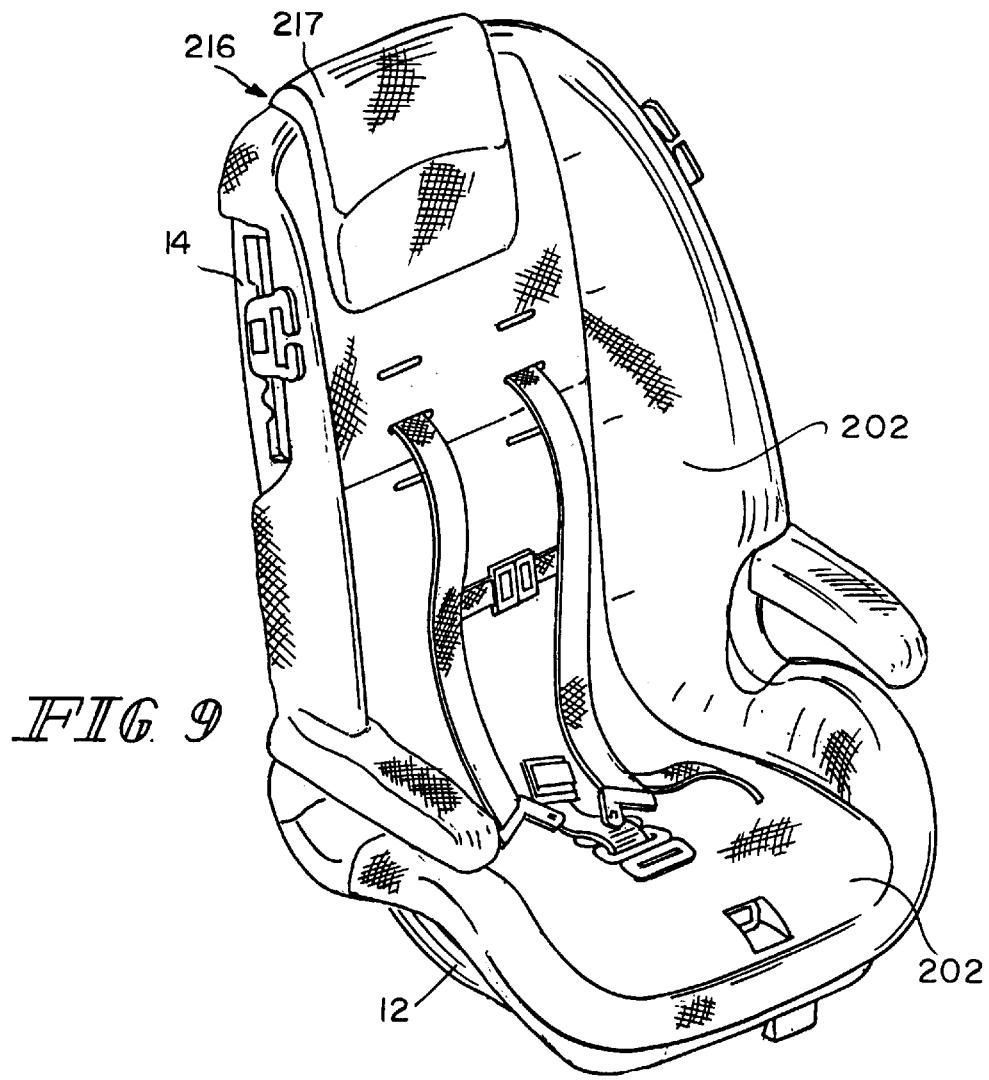
FIG. 9 is a perspective view of another embodiment of a juvenile vehicle se n accordance with the disclosure showing a movable headrest provided with is own fabric cover separate from the seat pad coupled to the rest of the seat.
Figure 10:
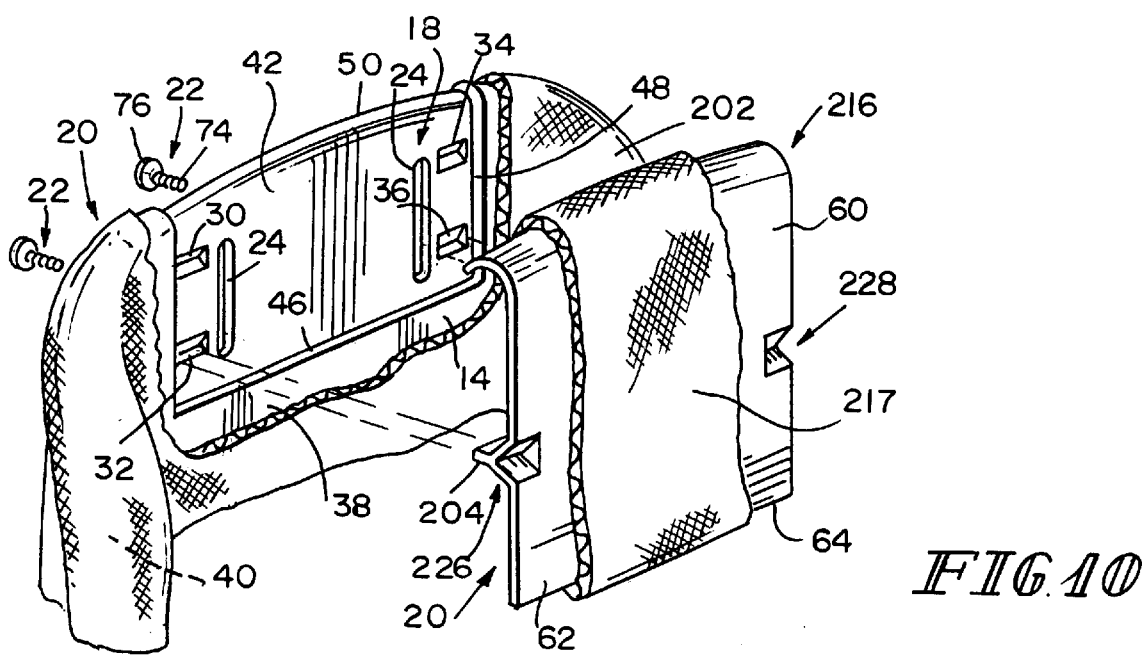
FIG. 10 is an enlarged view of the upper portion of the seat back illustrated in FIG. 9 showing the movable headrest prior installation of that fabric-covered headrest in a recess formed in the upper portion of the seat back.
Figure 11:
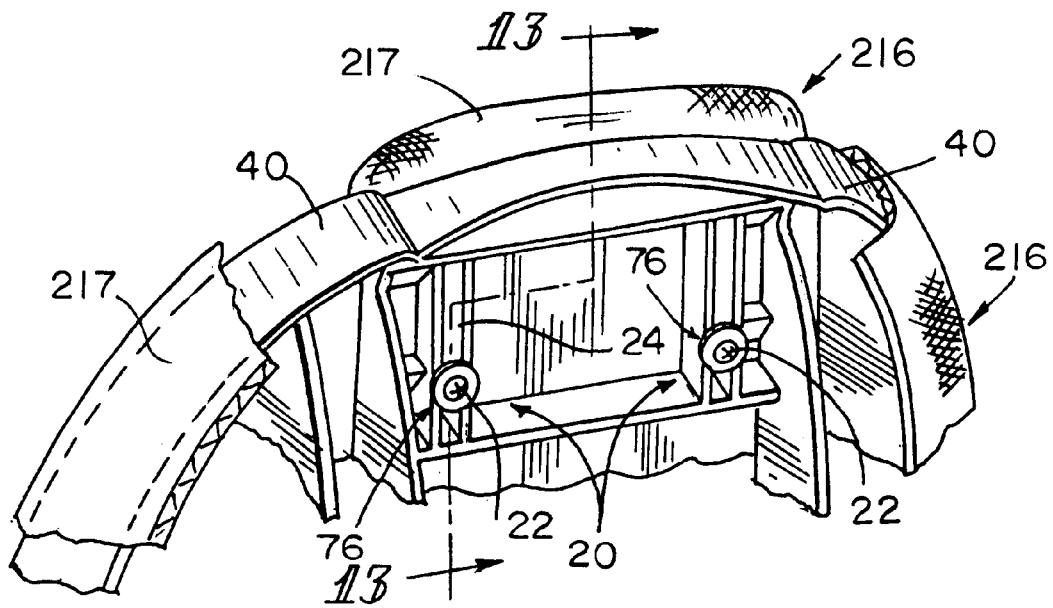
FIG. 11 is a rear perspective view of the upper portion of the seat back illustrated in FIG. 10 showing the headrest in a lowered position relative to the seat back.
Figure 12:
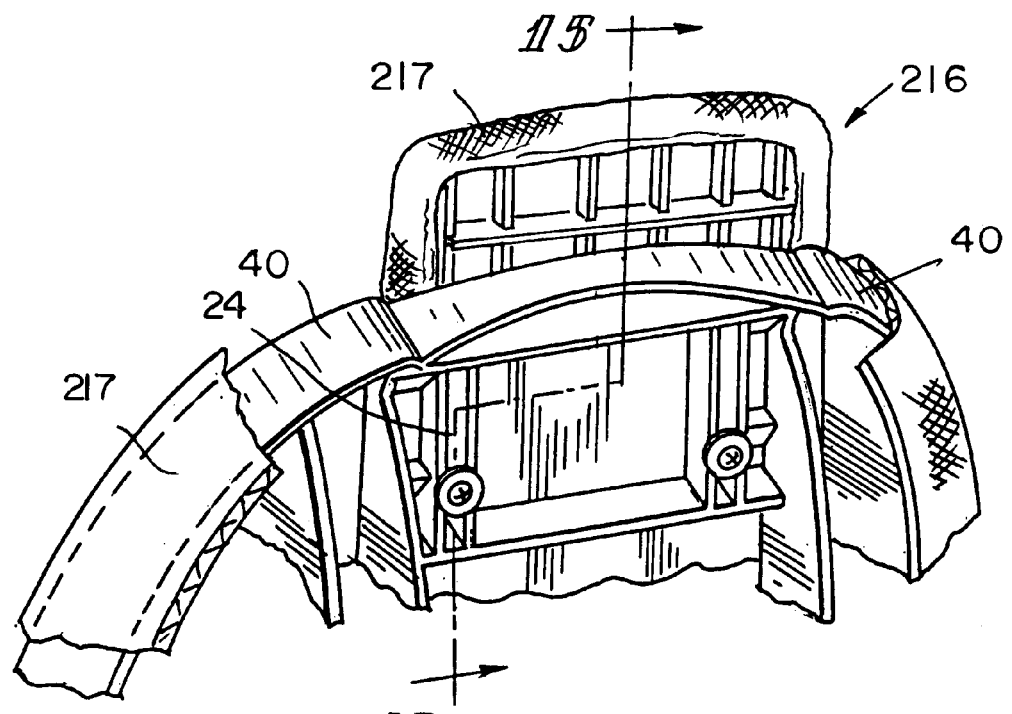
FIG. 12 is a view similar to FIG. 1 showing the fabric-covered headrest in a raised position relative to the seat back.

Headrest 116 illustrated in FIGS. 7 and 8 represents another embodiment of a headrest suitable for use in a juvenile vehicle seat 110 in accordance with this disclosure. Headrest 116 is formed to include a pair of spaced-apart side wings 111, 113 coupled to a headrest panel 156. Other features of the design shown in FIGS. 7 and 8 are in accordance with the disclosure set forth above.

A juvenile vehicle seat 210 in accordance with another embodiment of the disclosure is illustrated in FIGS. 9–15. In this embodiment, movable headrest 216 carries its own fabric cover 217 separate from the seat pad 202 covering seat bottom 12 and seat back 14. Also, a flange 204 is included in each of detents 226 and 228 as shown best in FIGS. 10 and 13–15. Flange 204 is a blade that is configured to engage and disengage detent notches 30, 32, 34, 36 formed in seat back 14 during movement of the headrest relative to seat back 14. Other features of the design shown in FIGS. 9–15 are in accordance with the disclosure set forth above.

Although the invention has been described in detail with reference to certain preferred embodiments, variations and modifications exist within the scope and spirit of the invention as described and defined in the following claims.

What is claimed is:

1. A juvenile vehicle seat assembly comprising
   a seat including a seat bottom and a seat back extending upwardly from the seat bottom, the seat back having a forwardly facing surface adapted to face toward an occupant of the seat, a recessed upper wall, and an interior edge bordering the recessed upper wall to define a headrest inset in the forwardly facing surface,
   a headrest mounted for movement relative to the seat back in the headrest inset between a lowered position to lie a first distance away from the seat bottom and a raised position to lie a greater second distance away from the seat bottom, and
   a headrest retainer located in the headrest inset and configured to retain the headrest in a selected one of the lowered and raised positions relative to the seat back at the option of a user.

2. The juvenile vehicle seat of claim 1, wherein the headrest includes a headrest panel having an upper portion extending into the headrest inset and a lower portion lying in front of the forwardly facing surface of the seat back.

3. The juvenile vehicle seat of claim 2, wherein the seat back further includes a bottom recess edge located to define a lowermost border of the headrest inset and the lower portion of the headrest panel includes a lowermost edge that is positioned to lie a first distance below the bottom recess edge when the headrest is moved to assume the lowered position and to lie a lesser second distance below the bottom recess edge when the headrest is moved to assume the raised position.

4. The juvenile vehicle seat of claim 1, wherein the headrest retainer includes a guide coupled to the upper wall of the seat back and to the headrest and the guide is arranged to couple the headrest to the seat back yet allow movement of the headrest relative to the seat back between the lowered and raised positions.

5. The juvenile vehicle seat of claim 4, wherein the guide includes a slot formed in the upper wall of the seat back to open into the headrest inset and a connector arranged to extend through and reciprocate in the slot and the connector is configured to include at one end a foot coupled to the headrest and at an opposite end a head sized to block removal of the connector from the slot yet allow reciprocating movement of the connector in the slot as the headrest moves between the lowered and raised position.

6. The juvenile vehicle seat of claim 4, wherein the locator includes a first notch associated with the lowered position of the headrest and formed in the upper wall of the seat back to open into the headrest inset, a second notch associated with the raised position of the headrest and formed in the upper wall of the seat back in spaced-apart relation to the first notch to open into the headrest inset, and a detent configured to anchor the headrest in a selected one of the lowered and raised positions yet allow movement of the headrest between the lowered and raised positions at the option of a user and coupled to the headrest to lie in the headrest inset and sized to fit into the first notch upon movement of the headrest to assume the lowered position and to fit into the second notch upon movement of the headrest to assume the raised position.

7. A juvenile vehicle seat assembly comprising
   a seat including a seat bottom and a seat back extending upwardly from the seat bottom, the seat back having a forwardly facing surface adapted to face toward an occupant of the seat and being formed to include a headrest recess in the forwardly facing surface,
   a headrest mounted for movement relative to the seat back in the headrest recess between a lowered position to lie a first distance away from the seat bottom and a raised position to lie a greater second distance away from the seat bottom, and
   a headrest retainer located in the headrest recess and configured to retain the headrest in a selected one of the lowered and raised positions relative to the seat back at the option of a user, wherein the headrest includes a headrest panel having an upper portion extending into the headrest recess and a lower portion lying in front of the forwardly facing surface of the seat back and wherein the seat back further includes a perimeter rim lying along an upper section of the seat back adjacent to the headrest recess and extending rearwardly away from the forwardly facing surface of the seat back and the headrest further includes a top flange coupled to the upper portion of the headrest panel and arranged to extend rearwardly away from the upper portion of the headrest panel to provide a finger-receiving space therebetween to facilitate gripping of the headrest by a user to enable the user to move the headrest up and down relative to the seat back between the raised and lowered positions.

8. The juvenile vehicle seat of claim 7, wherein the top flange is curved in cross-section and formed to include a concave surface arranged to face downwardly toward a portion of the perimeter rim.

9. The juvenile vehicle seat of claim 7, wherein the seat further includes a pliable seat pad having a perimeter portion coupled to the seat back and arranged to extend from the seat back and along the top flange and the upper portion of the headrest panel to cover an opening into the finger-receiving space provided between the perimeter rim of the seat back and the top flange of the headrest and wherein the pliable seat pad is deformable to move relative to the headrest as a user pushes a portion of the pliable seat pad into the finger-receiving space to grip the top flange of the headrest.

10. A juvenile vehicle seat assembly comprising
    a seat including a seat bottom and a seat back extending upwardly from the seat bottom, the seat back having a forwardly facing surface adapted to face toward an occupant of the seat and being formed to include a headrest recess in the forwardly facing surface,
    a headrest mounted for movement relative to the seat back in the headrest recess between a lowered position to lie a first distance away from the seat bottom and a raised position to lie a greater second distance away from the seat bottom, and a headrest retainer located in the headrest recess and configured to retain the headrest in a selected one of the lowered and raised positions relative to the seat back at the option of a user, wherein the seat back further includes a perimeter rim lying along an upper section of the seat back adjacent to the headrest recess and extending rearwardly away from the forwardly facing surface of the seat back and the headrest further includes a top flange coupled to the upper portion of the headrest panel and arranged to extend rearwardly away from the upper portion of the headrest panel to provide a finger-receiving space therebetween to facilitate gripping of the headrest by a user to enable the user to move the headrest up and down relative to the seat back between the raised and lowered positions.

11. The juvenile vehicle seat of claim 10, wherein the top flange is curved in cross-section and formed to include a concave surface arranged to face downwardly toward a portion of the perimeter rim.

12. The juvenile vehicle seat of claim 10, wherein the seat further includes a pliable seat pad having a perimeter portion coupled to the seat back and arranged to extend from the seat back and along the top flange and the upper portion of the headrest panel to cover an opening into the finger-receiving space provided between the perimeter rim of the seat back and the top flange of the headrest and wherein the pliable seat pad is deformable to move relative to the headrest as a user pushes a portion of the pliable seat pad into the finger-receiving space to grip the top flange of the headrest.

13. The juvenile vehicle seat of claim 12, wherein a section of the perimeter portion of the pliable seat pad is sized to form a hanging loop behind the seat back when the headrest is moved to assume the lowered position and a taut land above the seat back when the headrest is moved to assume the raised position.

14. A juvenile vehicle seat assembly comprising a seat including a seat bottom and a seat back extending upwardly from the seat bottom, the seat back having a forwardly facing surface adapted to face toward an occupant of the seat, the seat back being formed to include a headrest recess having an opening in the forwardly facing surface, the seat back further including an upper wall and an interior edge bordering the upper wall and cooperating with the upper wall to define the headrest recess, a headrest arranged to extend into the headrest recess, and a headrest guide located in the headrest recess and configured to support the headrest for movement relative to the seat back between a lowered position to lie a first distance away from the seat bottom and a raised position to lie a greater second distance away from the seat bottom, wherein the headrest guide includes a pair of slots formed in the upper wall of the seat back to lie in spaced-apart relation to one another and a post arranged to slide in each slot and coupled to the headrest to support the headrest as it moves relative to the seat back between the lowered and raised positions.

15. The juvenile vehicle seat of claim 14, further comprising a headrest locator including a first pair of notches formed in the upper wall of the seat back and arranged to open into the headrest recess and a first detent coupled to the headrest and arranged to fit into a lower notch included in the first pair of notches when the headrest is moved to assume the lowered position and into an upper notch included in the first pair of notches when the headrest is moved to assume the raised position.

16. The juvenile seat of claim 15, wherein each notch and the detent cooperate to provide means for camming the detent during movement of the headrest relative to the seat back from the lowered position to the raised position and vice versa so that the detent is moved to disengage one of the notches to facilitate such movement of the headrest.

17. The juvenile seat of claim 16, wherein the headrest is made of a yieldable material to deform when the detent has been disengaged from the notches and moved in contact with the upper wall along a path extending between the lower and upper notches and to provide spring means for yieldably urging the detent into engagement with one of the lower and upper notches upon arrival of the headrest at one of the lowered and raised positions.

18. The juvenile vehicle seat of claim 15, further comprising a second pair of notches formed in the upper wall of the seat back and arranged to lie in spaced-apart relation to the first pair of notches to position the pair of slots therebetween and a second detent coupled to the headrest and arranged to fit into a lower notch included in the second pair of notches when the headrest is moved to assume the lowered position and into an upper notch included in the second pair of notches when the headrest is moved to assume the raised position.

19. A juvenile vehicle seat assembly comprising a seat including a seat bottom and a seat back extending upwardly from the seat bottom, the seat back having a forwardly facing surface adapted to face toward an occupant of the seat, the seat back being formed to include a headrest recess having an opening in the forwardly facing surface, the seat back further including an inset upper wall and an interior edge bordering the upper wall and cooperating with the upper wall to define the headrest recess, the headrest being mounted for movement relative to the seat back between a lowered position to lie a first distance away from the seat bottom and a raised position to lie a greater second distance away from the seat bottom, and a headrest locator situated in the headrest recess, the headrest locator including a first pair of notches formed in the upper wall of the seat back and arranged to open into the headrest recess and a first detent coupled to the headrest and arranged to fit into a lower notch included in the first pair of notches when the headrest is moved to assume the lowered position and an upper notch included in the first pair of notches when the headrest is moved to assume the raised position.

20. The juvenile vehicle seat of claim 19, wherein each notch and the detent cooperate to provide means for camming the detent during movement of the headrest relative to the seat back from the lowered position to the raised position and vice versa so that the detent is moved to disengage one of the notches to facilitate such movement of the headrest.

21. The juvenile vehicle seat of claim 20, wherein the headrest is made of a yieldable material to deform when the detent has been disengaged from the notches and moved in contact with the upper wall along a path extending between the lower and upper notches and to provide spring means for yieldably urging the detent into engagement with one of the lower and upper notches upon arrival of the headrest at one of the lowered and raised positions.

22. The juvenile vehicle seat of claim 19, further comprising a second pair of notches formed in the upper wall of the seat back and arranged to lie in spaced-apart relation to the first pair of notches and a second detent coupled to the headrest and arranged to fit into a lower notch included in the second pair of notches when the headrest is moved to assume the lowered position and into an upper notch included in the second pair of notches when the headrest is moved to assume the raised position.

23. A juvenile vehicle seat assembly comprising
a seat including a seat bottom and a seat back extending upwardly from the seat bottom, the seat back having a forwardly facing surface adapted to face toward an occupant of the seat, the seat back further including an upper wall, a headrest being mounted for movement relative to the seat back between a lowered position to lie a first distance away from the seat bottom and a raised position to lie a greater second distance away from the seat bottom, and
a headrest retainer including a first pair of notches formed in the upper wall of the seat back and arranged to open toward an occupant of the seat and a first detent coupled to the headrest and arranged to fit into a lower notch included in the first pair of notches when the headrest is moved to assume the lowered position and an upper notch included in the first pair of notches when the headrest is moved to assume the raised position.

24. The juvenile vehicle seat of claim 23, wherein each notch and the detent cooperate to provide means for camming the detent during movement of the headrest relative to the seat back from the lowered position to the raised position and vice versa so that the detent is moved to disengage one of the notches to facilitate such movement of the headrest.

25. The juvenile vehicle seat of claim 24, wherein the headrest is made of a yieldable material to deform when the detent has been disengaged from the notches and moved in contact with the upper wall along a path extending between the lower and upper notches and to provide spring means for yieldably urging the detent into engagement with one of the lower and upper notches upon arrival of the headrest at one of the lowered and raised positions.

26. The juvenile vehicle seat of claim 23, further comprising a second pair of notches formed in the upper wall of the seat back and arranged to lie in spaced-apart relation to the first pair of notches and a second detent coupled to the headrest and arranged to fit into a lower notch included in the second pair of notches when the headrest is moved to assume the lowered position and into an upper notch included in the second pair of notches when the headrest is moved to assume the raised position.

27. The juvenile vehicle seat of claim 23, wherein the headrest retainer includes a guide coupled to the upper wall of the seat back and to the headrest and the guide is arranged to couple the headrest to the seat back yet allow movement of the headrest relative to the seat back between the lowered and raised positions.

28. The juvenile vehicle seat of claim 27, wherein the guide includes a slot formed in the upper wall of the seat back to open into the headrest recess and a connector arranged to extend through and reciprocate in the slot and the connector is configured to include at one end a foot coupled to the headrest and at an opposite end a head sized to block removal of the connector from the slot yet allow reciprocating movement of the connector in the slot as the headrest moves between the lowered and raised position.

29. A juvenile vehicle seat comprising
a seat including a seat bottom and a seat back extending upwardly from the seat bottom,
a headrest mounted for movement relative to the seat back between a lowered position to lie a first distance away from the seat bottom and a raised position to lie a greater second distance away from the seat bottom, and
a headrest retainer positioned to lie between the seat back and the headrest and configured to retain the headrest in a selected one of the lowered and raised positions relative to the seat back at the option of a user the headrest retainer further including a pair of notches formed in the seat back and a detent coupled to the headrest and arranged to fit into a first of the pair of notches when the headrest is moved to assume the lowered position and a second of the pair of notches when the headrest is moved to assume the raised position and
wherein the headrest retainer further includes a slot formed in the seat back and a connector coupled to the headrest and arranged to extend through and reciprocate in the slot to allow reciprocating movement of the connector in the slot as the headrest moves between the lowered and raised position.

30. A juvenile vehicle seat comprising
a seat including a seat bottom and a seat back extending upwardly from the seat bottom, the seat back including an upper section and a perimeter rim lying along the upper section
a headrest mounted for movement relative to the seat back between a lowered position to lie a first distance away from the seat bottom and a raised position to lie a second greater distance away from the seat bottom, the headrest further including a headrest panel and a top flange coupled to an upper portion of the headrest panel and arranged to extend rearwardly away from the upper portion of the headrest panel to provide a finger-receiving space therebetween to facilitate gripping of the headrest by a user to enable the user to move the headrest up and down relative to the seat back between the raised and lowered positions
the top flange is curved in cross-section and formed to include a concave surface arranged to face downwardly toward a portion of the perimeter rim and
wherein the seat further includes a pliable seat pad having a perimeter portion coupled to the seat back and arranged to extend from the seat back and along the top flange and the upper portion of the headrest panel to cover an opening into the finger-receiving space provided between the perimeter rim of the seat back and the top flange of the headrest and wherein the pliable seat pad is deformable to move relative to the headrest as a user pushes a portion of the pliable seat pad into the finger-receiving space to grip the top flange of the headrest.

* * * * *